US012314663B1

(12) United States Patent
Earle et al.

(10) Patent No.: US 12,314,663 B1
(45) Date of Patent: May 27, 2025

(54) ENDPOINT DETECTION

(71) Applicant: Salesforce, Inc., San Francisco, CA (US)

(72) Inventors: Adam Earle, Palo Alto, CA (US); Ali Ziaei, Palo Alto, CA (US); Jack Weissenberger, Palo Alto, CA (US); Romain Cosentino, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/636,671

(22) Filed: Apr. 16, 2024

(51) Int. Cl.
*G06F 40/284* (2020.01)

(52) U.S. Cl.
CPC .................. *G06F 40/284* (2020.01)

(58) Field of Classification Search
CPC ..................................... G06F 40/284
USPC ............................................. 704/9
See application file for complete search history.

(56) References Cited

U.S. PATENT DOCUMENTS

| | | | |
|---|---|---|---|
| 12,124,932 B1 * | 10/2024 | Poulis | G06N 20/00 |
| 2024/0160902 A1 * | 5/2024 | Padgett | G06N 7/01 |

OTHER PUBLICATIONS

Bijwadia et al., "Unified End-to-End Speech Recognition and Endpointing for Fast and Efficient Speech Systems", Nov. 1, 2022, 7 pages.
Li et al., "When can I Speak? Predicting initiation points for spoken dialogue agents", Aug. 7, 2022, 8 pages.
Lu et al., "Endpoint Detection for Streaming End-to-End Multi-Talker ASR", Jan. 24, 2022, 5 pages.
Min et al., "Adaptive Endpointing with Deep Contextual Multi-Armed Bandits", Mar. 23, 2023, 5 pages.
Roland Maas, "Alexa scientists address challenges of end-pointing", Amazon, available online at <https://www.amazon.science/blog/alexa-scientists-address-challenges-of-end-pointing>, Apr. 10, 2018, 5 pages.

* cited by examiner

*Primary Examiner* — Thierry L Pham
(74) *Attorney, Agent, or Firm* — Nicholson De Vos Webster & Elliott LLP

(57) ABSTRACT

Techniques are described herein for a method of obtaining a token based on a conversation in real time. The method further includes predicting, using a large language model (LLM) and the token, a next token. The method further includes predicting, using a classifier and the next token, a completion of a user turn. The method further includes triggering a next turn of the conversation in real time using the completion of the user turn.

20 Claims, 8 Drawing Sheets

ENDPOINT DETECTION

BACKGROUND

The field of Artificial Intelligence (AI) currently focuses on the implementation of artificial neural network systems that aim to mimic the functionality of neurons in the brain. Machine learning is a sub-area of AI in which a machine learning model is trained to perform one or more specific tasks. For instance, a machine learning model can be trained to perform a target task by relying on patterns and inferences learned from training data, without requiring explicit instructions pertaining to how the task is to be performed.

Large language models (referred to herein as LLMs) are neural networks trained to mimic human language. LLMs are trained to predict a next token of a block of text. This training allows LLMs to mimic human language by predicting responses in a conversation.

SUMMARY

Techniques are described herein for a method of predicting a completed user turn using endpoint detection. In operation, an endpoint detection system obtains a tokenized representation of an active conversation, where an active conversation is a conversation occurring between at least one user and a chat bot in real time. In some embodiments, each token represents a word of the active conversation. In other embodiments, each token aggregates characters (e.g., one or more portions of words or a combination of words) of the active conversation. A pipeline of the endpoint detection system is configured with at least one large language model (LLM) and one classifier to predict the completion of a user's turn. The LLM of the pipeline predicts a next token using one or more tokens of the active conversation. The next token can be a word or punctuation including a period, exclamation mark, question mark, etc. The LLM generates one or more features including an n-dimensional vector or a probability distribution over n classes, where n represents the candidate predicted next tokens. The features determined from the LLM are passed to the classifier to predict whether the user's turn is complete.

BRIEF DESCRIPTION OF THE DRAWINGS

The detailed description is described with reference to the accompanying drawings in which.

DETAILED DESCRIPTION

Figure 1:
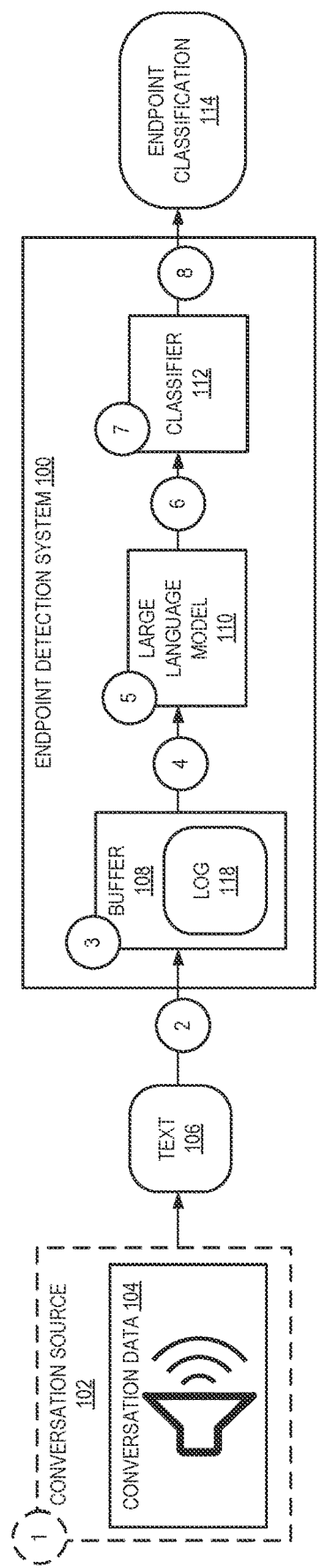
FIG. 1 illustrates an example endpoint detection system, in accordance with one or more embodiments.

LLMs are machine learning models trained to predict a next token of a block of text. In operation, LLMs track relationships in sequential data by receiving tokens (e.g., words in a sentence) and predicting a next token (or sequence of tokens). LLMs can be trained using any text on the internet as training data to tune billions of hyperparameters of the LLM. The LLM learns how to extract meaningful features (e.g., underlying patterns, characteristics, processes, etc.) of human language. As such, LLMs are able to mimic human language by generating responses that are coherent and contextualized. These models are well suited to form conversations (e.g., taking turns asking questions and providing responses) by predicting tokens (or sequences of tokens) that are tailored to the style and context of the conversation. As a result, LLMs are being deployed by service providers to communicate with users via audio communication and/or text communication. For example, some LLMs communicate with users via messaging services using text. Other LLMs communicate with users via telephonic services using audio. For instance, automated speech recognition (ASR) modules convert audio from a user into text using natural language processing algorithms. The text is processed by the LLM, allowing the LLM to predict a natural language text response. Subsequently, the predicted response is passed to a speech to text module to transform the text into audible speech recognizable by the user.

One technical problem associated with the deployment of LLMs (or other machine learning models) in the audio communication context is endpoint detection. Endpoint detection includes identifying when the user has completed their turn. Depending on the conversation, a turn can include a single word (e.g., "yes") or multiple sentences.

Some conventional approaches detect endpoints in an audio communication using audio features. Audio features can include the Mel-frequency cepstral coefficients, energy, tone, pitch, frequency of words in the audio communication (e.g., trailing silence), etc. Using such audio features, conventional approaches use classifier machine learning models to identify silence and/or recognize a user speaking to determine when the user has completed their turn. For example, detection of silence for 2 seconds in the audio signal can indicate a completed turn. However, these conventional approaches can cause awkward silences in the conversation when the conventional systems wait the threshold amount of time to determine that the user turn has ended. Additionally such conventional approaches can misinterpret pauses as a trigger for a completed turn even if the user turn is not finished (e.g., the user is thinking).

Other conventional approaches train a machine leaning model (or fine-tune a pretrained machine learning model) to classify whether a user has completed their turn. Training or fine-tuning such machine learning models requires training data including labeled turns, where a labeled turn is a turn that is labeled as "complete" or "incomplete." However, these conventional approaches tend to perform poorly on turns that are not included in the training data. Additionally, fine-tuning a pre-trained machine learning model (such as a LLM) can alter the natural language understanding capability of the LLM. As a result, the prediction capability of the LLM decreases as weights or other parameters of the LLM are adjusted to learn how to determine whether a user has completed their turn.

To address these and other deficiencies of conventional approaches, the endpoint detection system of the present disclosure leverages LLMs to semantically understand a turn and determine whether the turn is completed. The endpoint detection system of the present disclosure uses a pipeline that extracts features from an LLM to predict an endpoint probability. The endpoint detection system can be applied in multiple domains to identify an endpoint probability in particular domains. That is, the endpoint detection system is not limited to the capability of semantic understanding. Instead, the endpoint detection system can leverage information of a domain to determine the likelihood of a completed user turn with respect to the particular domain.

FIG. 1 illustrates an example endpoint detection system, in accordance with one or more embodiments. The pipeline of the endpoint detection system 100 leverages features output by the large language model 110 to determine endpoint classification 114. In some embodiments, the endpoint detection system 100 may be incorporated into an application, a suite of applications, etc. or may be implemented as a standalone system which interfaces with an application, a suite of applications, etc.

At numeral 1, the conversation source 102 obtains conversation data 104 (e.g., audio data, text data, video data) and transcribes the conversation data 104 into text 106. The conversation source 102 is any type of system that transcribes at least the conversation data 104 (e.g., audio data or video data) into text 106. For ease of description, the present disclosure describes an audio conversation between at least one user and an automated chat bot. However, other conversations (and corresponding conversation data 104) can be obtained in other mediums (e.g., text, video).

The conversation source 102 can execute any one or more natural language algorithms to derive text 106 from the audio conversation data 104. Text 106 includes one or more words of the conversation data 104. Text 106 can also include punctuation of the conversation data 104. In some embodiments, text 106 can be a word-by-word stream of transcribed words spoken in the conversation data 104. The conversation data 104 of the conversation source 102 is transcribed into text 106 in real time. That is, the text 106 of the conversation data 104 is generated at a time when a user is actively engaged in communication via the conversation source 102.

At numeral 2, the endpoint detection system 100 receives text 106. In some embodiments, the text 106 is a word-by-word stream of transcribed words spoken in the conversation data 104. In some embodiments, in addition to receiving text 106, the endpoint detection system 100 receives audio features associated with the conversation data 104. For example, one or more components of the conversation source 102 (not shown) can extract non-lexical features such as emotion, an age, and/or a gender from the audio using audio features such as the Mel-frequency cepstral coefficients, energy, tone, frequency of words in the audio signal, dialect, vocabulary, etc., determined from the conversation data 104.

At numeral 3, the buffer 108 stores text 106. Over time (e.g., over a duration of the conversation), the buffered text 106 becomes log 118. That is, text 106 is stored by buffer 108 such that a log 118 of the conversation is maintained as the communication progresses. In some embodiments, each word of the conversation data 104 is stored as a token in the log 118. That is, each token represents a word of the conversation. In other embodiments, the log 118 can include tokens representing multiple words, a portion of a word, and/or one or more phrases of the conversation. In some embodiments, a token represents punctuation such as non-alpha, non-numeric ASCII strings. Accordingly, the log 118 is a tokenized representation of the conversation data 104.

The log 118 of the conversation can include any buffered portion of the conversation data 104 including the k most recent transcribed tokens (e.g., the k most recent text 106) and/or the m most recent seconds of the conversation. In some embodiments, the log 118 of the conversation can include the k most recent turns of the conversation, where a turn is an interaction of the conversation, such as block of speech (audio or text) communicated by one of the participants. For instance, one turn of the conversation can include a user speaking to an automated chat bot. A subsequent turn of the conversation includes the chat bot's response to the user. Accordingly, the buffer 108 stores tokens of the k most recent turns of the conversation. Additionally or alternatively, the log 118 includes all of the turns of the conversation (e.g., all of the tokens). For example, the log 118 can include a transcript of every turn from the initialization of the conversation to the current position in the conversation. Additionally or alternatively, the log 118 includes k bytes of buffered conversation data 104.

The log 118 can be updated in real time as the communication between a user and a customer service agent (such as a chat bot) progresses. For example, each time the customer service agent and/or user speak (e.g., via conversation source 102), the log 118 is updated with a token corresponding to the spoken audio.

The log 118 provides context to the endpoint detection system 100. For example, a turn including a user speaking "123" responsive to a previous turn including the customer service agent asking "what is your street address" can indicate that the user has completed their turn. That is, "123" is a possible response to a street address question. In contrast, a turn including a user speaking "123" responsive to a previous turn including the customer service agent asking "what is your phone number" can indicate that the user has not completed their turn. That is, "123" is not a high probability response to the phone number question.

At numeral 4, the large language model (LLM) 110 receives the log 118 (e.g., the one or more tokens representing the conversation). The LLM can be any pretrained LLM trained to perform natural language understanding tasks. As described in more detail below, the LLM 110 predicts a next token of the log 118, representing the likely next word of the conversation or punctuation of the conversation including periods, question marks, exclamation points, ellipses, etc. In some embodiments, such punctuation represent a high likelihood of an endpoint (e.g., endpoint indicators).

At numeral 5, the LLM 110 processes the log 118 to predict a next token of the log 118. In operation, the LLM 110 receives the log 118 in a prompt, which is a natural language instruction. The prompt instructs the LLM to perform a task. For example, the prompt can instruct the LLM 110 to predict a next token of the user's turn given a sequence of tokens (e.g., the log 118). For example, given j number of tokens stored in log 118, the LLM 110 predicts the j+1 token.

The output of the LLM 110 can include an n-dimensional vector of logits (e.g., n unnormalized scores corresponding to n candidate predicted next tokens for the j+1 token). Each dimension of the n-dimensional vector represents a token (which can include punctuation, as described above) of n candidate predicted next tokens for the j+1 token. The output of the LLM 110 can also include a probability distribution. In some embodiments, one or more layers of the LLM 110 include a softmax function, which is a normalized exponential function that transforms an input of real number logits into a normalized probability distribution over candidate predicted next tokens. The probability distribution represents the probability of each of the n candidate predicted next tokens being the next token (e.g., the j+1 token)

In some embodiments, the LLM 110 can use beam searching to identify multiple vectors of logits and process the multiple vectors of logits as a batch. For example, instead of predicting a single n-dimensional vector of candidate predicted next tokens for the j+1 token, the LLM 110 can predict a first n-dimensional vector of candidate predicted next tokens for the j+1 token, a second n-dimensional vector of candidate predicted next tokens for the j+2 token, and so on, using beam searching or other multi-step generational searching. Whereas the prediction of the j+1 token is independent of the j+2 token, the prediction of the j+2 token is dependent of the j+1 token. Accordingly, the LLM 110 can use beam searching to predict subsequent tokens of the sequence (e.g., the j+1 token, the j+2 token, etc.) using the conditional probability of previous tokens in the sequence.

In some embodiments, the prompt can instruct the LLM 110 to determine whether the user's turn is complete and provide a reasoning. Accordingly, the output of the LLM 110 can include a classification (e.g., endpoint detected, no endpoint detected) and reasoning, which can include the vector of logits, the probability distribution, a number k of highest probability candidate predicted next tokens (e.g., determined from the probability distribution or the vector of logits), and the like.

In some embodiments, the prompt can include other natural language information. For example, some prompts can include examples of completed turns (or other portions of a conversation) (e.g., few-shot prompts), while other prompts can include no examples of completed turns (or other portions of a conversation) (e.g., zero-shot prompts). In some embodiments, when an example is included in the input prompt, the example includes punctuation (e.g., ellipses, which can representing pauses; question marks; exclamation points; periods) and the token completion (e.g., all of the words, characters, and/or phrases spoken during a turn or other portion of the conversation). In some embodiments, the prompt can include a request that the LLM 110 explain reasoning of the predicted token (e.g., chain of thought prompting). For example, the LLM 110 performs the task provided in the prompt (e.g., predicting a next token of the user's turn) using intermediate steps where the LLM 110 explains the reasoning as to why it predicted the next token.

At numeral 6, the LLM 110 passes one or more features to the classifier 112. Features passed to the classifier 112 can include the output of the LLM 110 and/or one or more transformations applied to the output of the LLM 110. For example, features passed to the classified can include a classification (e.g., endpoint detected, no endpoint detected), the vector of logits (representing the predicted candidate next tokens), the probability distribution (representing the predicted candidate next tokens), the top-k number of highest probability predicted candidate next tokens (e.g., determined from the probability distribution or the vector of logits), the top-p number of highest probability predicted candidate next tokens (e.g., the most probable tokens determined from the probability distribution whose probability sums to a value p), and the like.

In some embodiments, one or more analyses are performed on the output of the LLM 110. For instance, one or more rules can be applied to the output of the LLM 110 to create features passed to the classifier 112. In a non-limiting example, given the top k number of highest probability predicted candidate next tokens, one or more components (e.g., the LLM 110, the classifier 112, and/or other components not shown in the endpoint detection system 100) can evaluate whether one of the top k highest probability predicted candidate next tokens include punction, and whether one of the top k highest probability predicted candidate next tokens include a line break. Given the occurrence of both a line break and a punctuation in the top k highest probability predicted candidate next tokens, a feature is created that indicates a high likelihood that the user's turn has completed and/or the customer service agent's turn should begin.

In another non-limiting example, one or more components (e.g., the LLM 110, the classifier 112, and/or other components not shown in the endpoint detection system 100) can evaluate whether one of the top k highest probability predicted candidate next tokens includes punction, and whether one of the top k highest probability predicted candidate next tokens includes a next word. Given the occurrence of both a next word and a punctuation in the top k highest probability predicted candidate next tokens, a feature is created that indicates a likelihood that the user's turn has completed a sentence (e.g., a completed thought or an utterance) but the user's turn is incomplete.

Additionally or alternatively, one or more statistical processes can be applied to the output of the LLM 110 to obtain features passed to the classifier 112. For example, a skewness feature (e.g., a measure of the distortion of the probability distribution) can be obtained using the probability distribution, a centrality feature (e.g., one or more tokens of the predicted candidate next tokens at the center of the probability distribution) can be obtained using the probability distribution, and the like.

At numeral 7, the classifier 112 uses the LLM 110 output as a feature. In some embodiments, the classifier 112 determines whether the user has completed their turn in the conversation. In operation, the classifier 112 determines whether an endpoint is detected (e.g., an endpoint probability) using one or more features based on the output of the LLM 110. The endpoint probability represents a likelihood that the user's turn is complete.

Just because the highest probability predicted next token is a period (or other punctuation such as an endpoint indicator token) does not represent that the user's turn is complete. For example, a period can be included in pauses (e.g., ellipses), special formats (e.g., addresses, emails, numbers, currency), and honorofics (Mr., Mrs., Ms., Dr., etc.). Accordingly, the classifier 112 of the endpoint detection system 100 uses the predicted candidate next tokens (e.g., a probability distribution, a vector of logits, etc.) and in some instances, additional information (such as the audio signal, audio features, etc.) to predict whether the user turn has ended (e.g., the endpoint probability). Further, while a period (or other endpoint indicator token) can be identified in the user's turn, the classifier 112 may not determine that the user's turn is complete if, for instance, the user is expected to continue with their turn based on the context of the conversation (e.g., log 118).

In some embodiments, the classifier 112 uses a threshold to compare the highest probability predicted candidate next token (e.g., based on the probability distribution of the LLM 110 and/or other feature determined using the LLM 110) to a threshold. For example, if the highest probability predicted candidate next token is an endpoint indicator, and the probability of the endpoint indicator satisfies the threshold, the classifier 112 can classify the turn as being completed. In other words, the classifier 112 has detected an endpoint.

In some embodiments, the classifier 112 is a binary classifier (e.g., a neural network) that classifies whether a turn in the conversation has ended (e.g., the classifier 112 has detected an endpoint) or whether the turn in the conversation has not ended (e.g., the classifier 112 has not detected an endpoint) using one or more features based on the LLM 110 output. In some embodiments, the classifier 112 is a multiclass classifier. In other embodiments, the classifier 112 is another token predictor. For example, the classifier 112 can be a machine learning model such as a transformer, a long-short term memory neural network, a recurrent neural network, and the like, trained to predict a next token given one or more features based on the LLM 110 output (e.g., the predicated candidate next tokens in the form of a probability distribution or a vector of logits and/or other features derived from the probability distribution of the vector of logits). In some embodiments, responsive to the next token predicted by the classifier 112 being an endpoint indicator (e.g., punctuation including a period, an exclamation mark or a question mark), the classifier 112 classifies that the turn in the conversation has ended. That is, the endpoint classification (e.g., endpoint probability) satisfies a user turn completion threshold. Similarly, responsive to the next token predicted by the classifier 112 not being an endpoint indicator, the classifier 112 can classify that the turn in the conversation has not ended. That is, the endpoint probability does not satisfy the user turn completion threshold.

In some embodiments, the classifier 112 uses the one or more features based on the LLM 110 output and additional features associated with the conversation data 104 to determine endpoint classification 114 (e.g., the endpoint probability). For example, audio features obtained from the conversation data 104 such as Mel-frequency cepstral coefficients, energy, tone, pitch, frequency of words in the audio communication (e.g., trailing silence), etc., can be input to the classifier 112. In this embodiment, the classifier 112 is a multi-modality model because it receives one or more language features based on the LLM 110 output and audio features based on the conversation data 104. Additionally or alternatively, the text 106 and/or log 118 can be input to the classifier 112.

At numeral 8, the classifier 112 outputs an endpoint classification 114. In some embodiments, the endpoint classification 114 is a binary classification including a predicted endpoint class representing the end of a turn of the conversation and a non-predicted endpoint class representing the turn has not ended. In some embodiments, the endpoint classification 114 is the endpoint probability determined by the classifier 112 using one or more features based on the output of the LLM 110. In some embodiments, the endpoint classification 114 is the predicted next token determined by the classifier 112.

Figure 2:
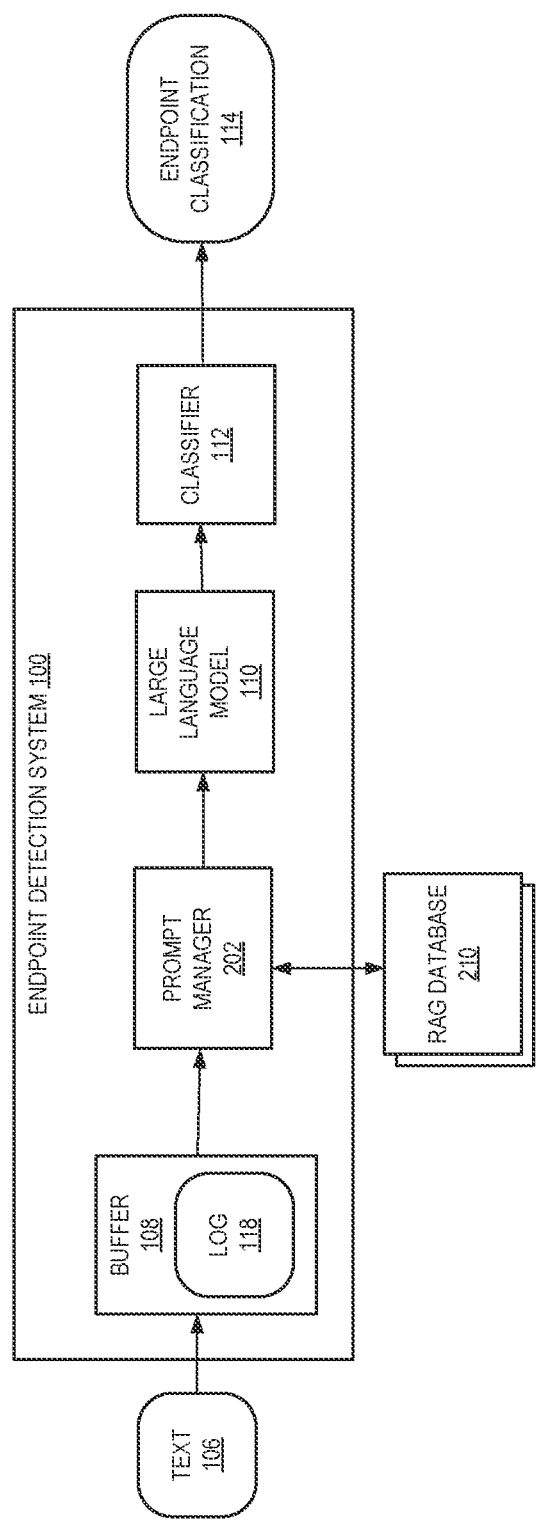
FIG. 2 illustrates an example of using retrieval augmented generation in the endpoint detection system, in accordance with one or more embodiments.

FIG. 2 illustrates an example of using retrieval augmented generation in the endpoint detection system, in accordance with one or more embodiments. Retrieval augmented generation (RAG) is used to query knowledge databases (such as RAG database 210) to provide context to language models (such as LLM 110) using a prompt. For example, a turn in the conversation 102 can include a user saying, "My reward number is 1234." The LLM 110 uses the context provided by the RAG database 210 to predict the next token in the sequence.

For example, in a first domain, a reward number is four digits such that the reward number "1234" spoken by the user is a valid reward number. In a second domain, a reward number is six digits such that the reward number "1234" spoken by the user is an invalid reward number. Obtaining this domain-specific information using RAG provides context to the LLM 110 via the prompt that can shift the LLM 110 prediction of the predicted candidate next token. For example, given RAG examples of the first domain, the LLM 110 may determine that a predicted candidate next token of an endpoint indicator is a likely next token because reward numbers are four digits and there is a high probability that the user has completed their turn. In other words, the probability of endpoint indicator tokens (question marks, exclamation points, periods), determined by the LLM 110, would be higher than the probability of word tokens, representing that the user's turn may be complete.

In contrast, given RAG examples of the second domain, the LLM 110 is less likely to determine that the predicted candidate next token is an endpoint indicator because reward numbers are six digits instead of four, indicating that the user has not completed their turn. In other words, the probability of endpoint indicator tokens (question marks, exclamation points, periods), determined by the LLM 110, would be lower than the probability of word tokens, representing that the user's turn is incomplete.

As described herein, a prompt is a natural language instruction used to instruct an LLM to perform a task. Few-shot prompts include examples of the task the LLM is instructed to perform and/or provide information used to help the LLM perform the task it is instructed to perform. The prompt manager 202 generates the prompt for the LLM 110.

In some embodiments, the prompt manager 202 can provide the tokenized conversation (e.g., log 118) to the LLM 110 in the form of the prompt, where the prompt includes a description of a task to be performed. For example, the prompt can instruct the LLM 110 to predict a next token of the user's turn given a sequence of tokens (e.g., the tokenized conversation).

In operation, the prompt manager 202 generates an embedding of the text 106 and/or the log 118. For example, the prompt manager 202 can include an encoder that encodes the token into the embedding. An embedding is a latent space representation of the conversation (e.g., the text 106 and/or the log 118). The embedding encodes the meaning of the token in an embedding space, where tokens associated with words having similar meanings are positioned closer together in the embedding space. In some embodiments, the token embedding of the text 106 and/or the log 118 is stored in the buffer 108.

In some embodiments, the prompt manager 212 can retrieve one or more examples from multiple RAG databases 210. For example, a first external system hosts a first RAG database, a second external system hosts a second RAG database, and a third external system hosts a third RAG database. Additionally or alternatively, the first external system hosts the first RAG database and the second RAG database.

In some embodiments, each of the RAG databases 210 are associated with a domain, where a domain is a particular technology field, service field, product, and the like. In a first non-limiting example, a first RAG database is associated with a first doctor's office, a second RAG database is associated with a second doctor's office, and a third RAG database is associated with a hotel company. Accordingly, the prompt manager 212 queries the first RAG database given a conversation 102 associated with the first doctor's office, the prompt manager 212 queries the second RAG given a conversation 102 associated with the second doctor's office, and the prompt manager 212 queries the third RAG database given a conversation 102 associated with the hotel company. This is because, for example, the context (e.g., the questions asked, the answers provided, the vocabulary, the tone, etc.) of the conversation given the first domain (a first doctor's office) is different from the context of the second domain (a second doctor's office) and the context of the third domain (a hotel company).

In a second non-limiting example, the first RAG database is associated with the medical field and the second RAG database is associated with a hospitality field. Accordingly, the prompt manager 202 queries the first RAG database given a conversation associated with a first doctor's office or a second doctor's office, and the prompt manager 202 queries the second RAG database given a conversation associated with a hotel company. This is because, for example, the context (e.g., the questions asked, the answers provided, the vocabulary, the tone, etc.) of the conversation given the first domain (the medical field) is different from the context of the second domain (the hospitality field)

In embodiments, where there are multiple RAG databases 210, the prompt manager 202 receives an indication of which RAG database 210 to query. For example, the text 106 (or log 118) can include a tag indicating a particular domain. Responsive to the indication of a particular domain, the prompt manager 202 determines which RAG database 210 to query. For example, a conversation tagged with "1" indicates a conversation associated with the first domain, a conversation tagged with "2" indicates a conversation associated with the second domain, and the like.

During run-time (e.g., during an ongoing conversation), the prompt manager 202 compares token embeddings of the conversation (e.g., the tokenized text 106 and/or log 118) to embeddings of examples of portions of conversations obtained from one or more RAG databases 210. In some embodiments, the prompt manager 202 queries the RAG database 210 for one or more examples of portions of domain-specific conversations (e.g., conversations or portions of conversations stored in the RAG database 210) during run-time and subsequently encodes the received examples such that the prompt manager 202 obtains token embeddings of the received examples. In other embodiments, the prompt manager 202 queries the RAG database 210 for one or more examples of portions of domain-specific conversations at a time other than run-time. In these embodiments, the prompt manager 202 can encode and index the received examples thereby mapping the conversation embeddings to the corresponding RAG database 210.

The prompt manager 202 compares the embeddings of conversation (e.g., the tokenized text 106 and/or log 118) with the embeddings derived from examples obtained from the RAG database 210 to identify similar embeddings using any suitable method. For instance, the prompt manager 202 can apply cosine similarity to quantify the similarity between embeddings based on the cosine of the angle between the embeddings in embedding space. Specifically, the prompt manager 202 takes the cosine of token embeddings of the text 106 and token embeddings obtained from the RAG database 210. The value of the cosine similarity is within the range between −1 and 1, where higher, positive values (closer to 1) indicate greater degrees of similarity, and lower, negative values (closer to −1) indicate greater degrees of dissimilarity. Additionally or alternatively, the prompt manager 202 can identify k embeddings derived from examples obtained from the RAG database 210 that are similar to embeddings of the conversation (e.g., the tokenized text 106 and/or log 118) using k nearest neighbor clustering.

After identifying one or more embeddings derived from examples obtained from the RAG database 210 that are similar to embeddings of the conversation, the prompt manager 202 can include the one or more similar embeddings of examples obtained from the RAG database 210 in the prompt provided to the LLM 110. Accordingly, the LLM 110 receives domain-specific context when predicting candidate next tokens. In other words, the prompt generated by the prompt manager 202 includes relevant few-shot domain-specific examples of portions of conversations based on the received conversation.

In some embodiments, the portions of the conversation stored in the RAG database 210 are synthetically generated. For example, a machine learning model can generate one or more portions of the conversation (e.g., three turns in a conversation, one turn in a conversation, etc.). In some embodiments, the portions of the conversation stored in the RAG database 210 are historic conversations. For example, portions of the conversation can be stored in the RAG database 210. In some embodiments, the portions of the conversation are manually reviewed (e.g., by an administrator) before being stored in the RAG database 210.

While RAG database 210 is illustrated as being outside the endpoint detection system 100 (e.g., hosted by one or more external systems), the endpoint detection system 100 can also host one or more RAG databases 210. In these embodiments, the endpoint detection system 100 manages the RAG database 210, updating the RAG databases 210 with examples of portions of a conversation.

Using the prompt generated by the prompt manager 202, the LLM 110 predicts a next token of the log 118 as described with reference to FIG. 1. Accordingly, the output of the LLM 110 can include a vector of logits, a probability distribution, a classification of whether an endpoint is detected or not, reasoning for the classification, and the like. The classifier 112 determines endpoint classification 114 as described with reference to FIG. 1. The endpoint classification 114 can be a binary classification, an endpoint probability, a predicted next token, and the like.

Figure 3:
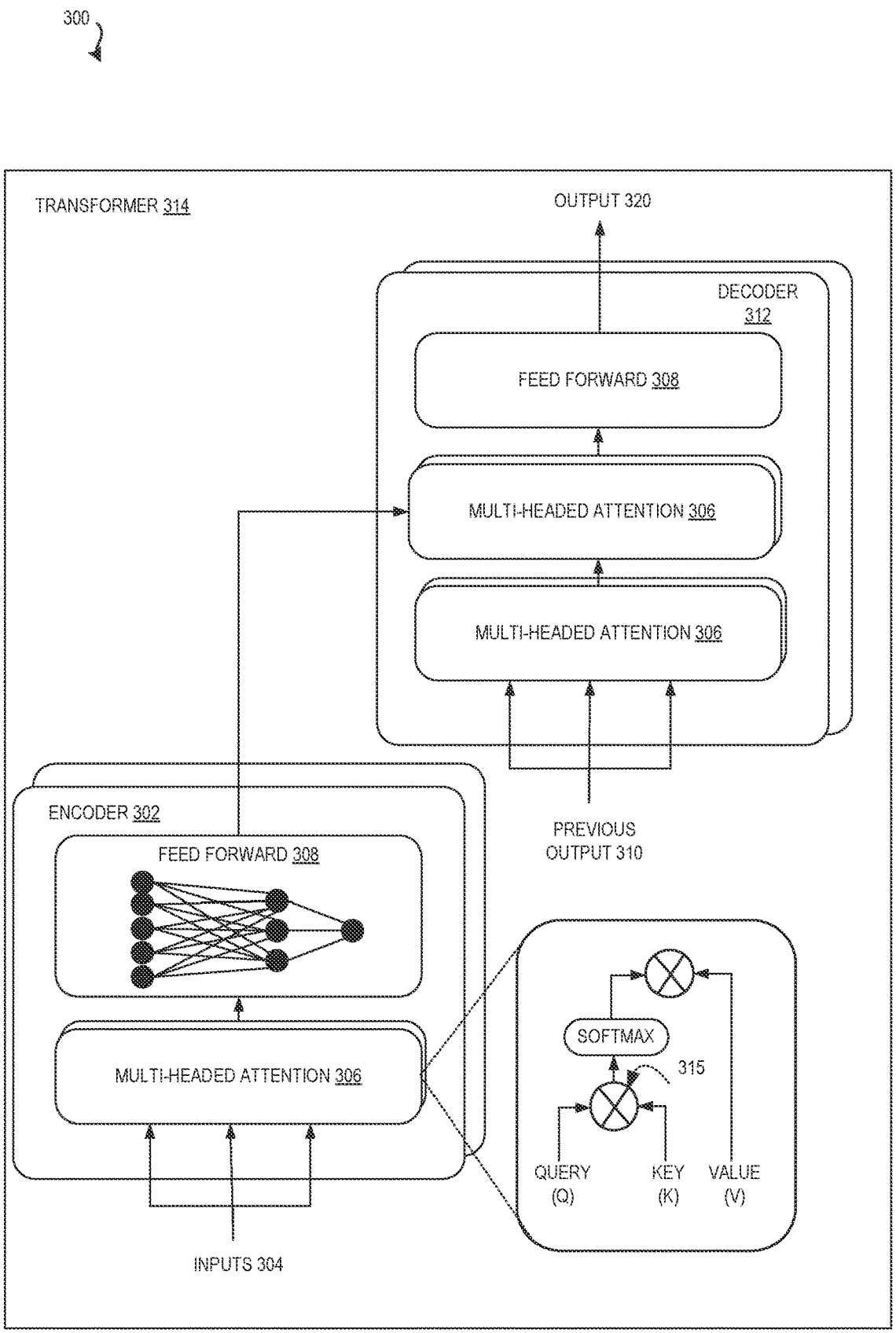
FIG. 3 illustrates an example of a simplified transformer architecture, in accordance with one or more embodiments.

FIG. 3 illustrates an example of a simplified transformer architecture, in accordance with one or more embodiments. As shown in example 300, transformer 314 is an encoder-decoder transformer architecture (represented by encoder 302 and decoder 312), however other architectures of transformers exist, including encoder only transformers and decoder only transformers. In some embodiment, transformer 314 is a LLM.

As shown, the operations of the encoder 302 and decoder 312 are similar. For example, encoder-decoder transformer architectures cascade one or more attention blocks (e.g., multi-headed attention block 306) and feed forward blocks (e.g., feed forward 308 block) in one or more encoder 302 layers and decoder 312 layers. As such, the operations of the encoder 302 and decoder 312 are similar.

One difference between the encoder 302 and decoder 312 is the inputs. For example, the encoder 302 receives inputs 304 whereas the decoder 312 receives a previous output 310. During a first iteration (of training or deployment), the decoder 312 outputs a first output 320. During a second iteration, the input to the decoder 312 (e.g., previous output 310) is the first output 320 determined by the decoder 312 during the first iteration. For ease of description, the operations of the encoder 302 are described, however similar operations can be described for the decoder 312.

In operation, inputs 304 are tokens of a sentence fed to the encoder 302. For example, inputs 304 can include a tokenized representation of each sentence of conversation (described in FIG. 1). In some embodiments, the tokens are converted into embeddings, which are vector representations of the tokens. In some embodiments (not shown) the embeddings are passed to a positional encoding layer, which adds positional information into each vector. Positional information is added to retain information regarding the order of words in the sentence. In some embodiments, sine waves or cosine waves are used to map the position of each word in the sentence, therefore tracking the position of each word in the sentence.

Multi-headed attention block 306 is a block that performs attention using multiple heads. While shown as multi-headed attention block 306, it should be appreciated that some transformers include a single headed attention block. In multi-headed attention block 306, each head receives a linearly projected version of inputs 304 and produces an output to be fed to the feed forward block 308 in parallel. The feed forward block 308 can be any neural network model that applies non-linear transformations to the output of the multi-headed attention block.

In the multi-headed attention block 306, each head transforms the (position encoded) input vector 304 based on a sequence of tokenized words into a query vector space. The query vector space Q is used to identify a token in the subset of tokens (e.g., a target token) to be attended using a query weight matrix $W_Q$ and linear map of X (e.g., inputs 304). Equation (1) below represents this mathematically:

$$Q = X W_Q^T \quad (1)$$

Each head also transforms the (position encoded) input vector 304 into a key vector space. The key vector space K is used to identify the most relevant word in the sequence related to the query using a key weight matrix $W_K$ and the linear map of X (e.g., inputs 304). Equation (2) below represents this mathematically:

$$K = X W_K^T \quad (2)$$

The relationship of the tokens is compared, using the dot product of $W_Q$ and $W_K$ for instance, to determine a similarity of the tokens in the sequence to the target token. The above described mathematical operations are performed using the attention block at 315. Equation (3) below represents this mathematically and includes two linear maps (e.g., $x_i^T W_Q$ and $W_K^T x_j$).

$$M_{i,j} = x_i^T W_Q W_K^T x_j, \ \forall i,j \in \{1, \ldots, n\} \quad (3)$$

Further, each head transforms the input vector 304 into a value vector space V. The value vector space represents the value of each token in the sequence (e.g., inputs 304) to attend the sequence using $W_V$. Equation (4) below represents this mathematically:

$$V = X W_V^T \quad (4)$$

The output of each head weighs each element in the sequence, attending the sequence. In multi-headed attention, the output of the heads are concatenated and multiplied by a weight matrix $W_O$. The weight matrix $W_O$ represents the algorithmic combination of different heads learning different information about the sequence. Mathematically, multi-headed attention is represented according to Equation (5) below:

$$u_i = \sum_{h=1}^{H} W_{h,O}^T \sum_{j=1}^{n} P_{i,j}^{(h)} W_{h,v}^T (x_j) \quad (5)$$

$$P_{i,j}^{(h)} = \frac{\exp(x_i^T W_{h,Q} W_{h,K}^T x_j)}{\sum_{j=1}^{n} \exp(x_i^T W_{h,Q} W_{h,K}^T x_j)} = \mathrm{softmax}(M)$$

In Equation (5) above, the sentence including x tokens is mapped to an attended token $u_i$ for i={1, . . . n} tokens, H represents the number of heads in the multi-headed attention block 306, n represents the number of tokens in the sentence, $W_O$ is the weight matrix between heads, and P is the self-attention matrix including weight matrices $W_K$, $W_V$, $W_Q$.

The outputs 320 include embeddings or tokens of predicted next words of the sentence, including punctuation. For example, the outputs 320 can include a vector of dimension x with x predicted output tokens. In some embodiments, the outputs 320 are transformed into a probability distribution representing the probability of each of the x predicted output tokens.

Figure 4:
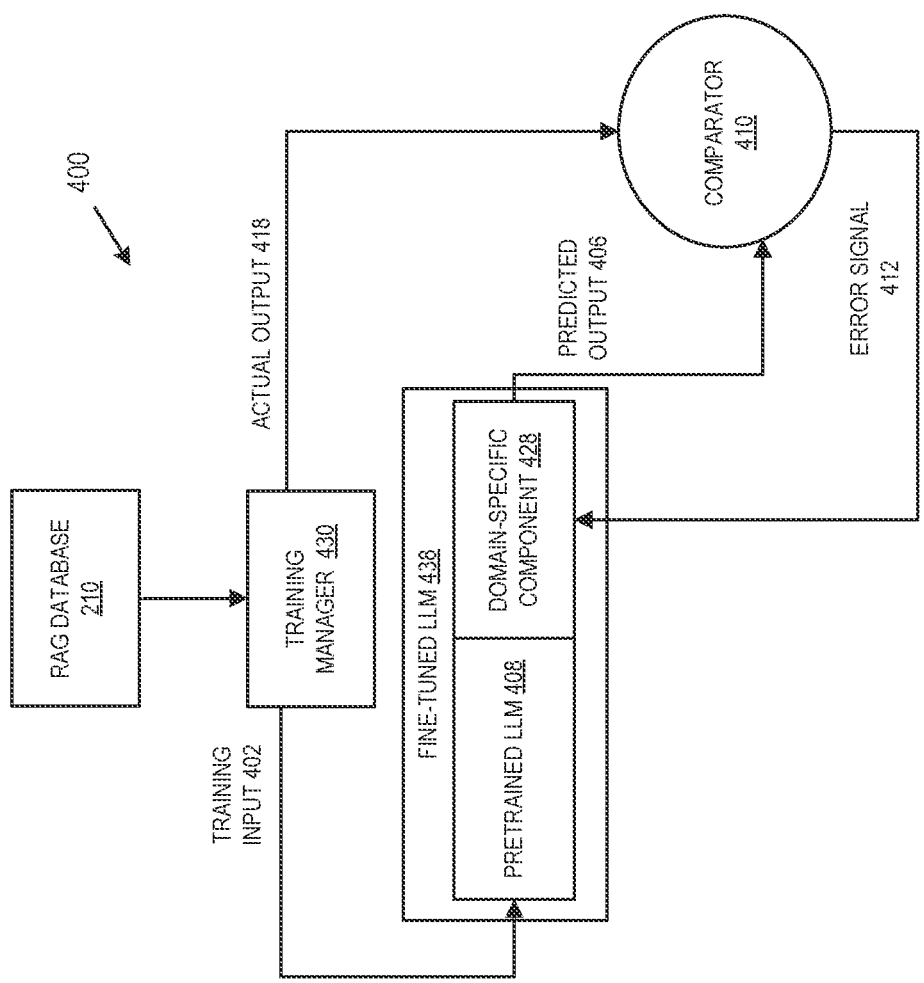
FIG. 4 is a flow diagram of an example method for fine-tuning a pretrained LLM using supervised learning, in accordance with some embodiments of the present disclosure.

FIG. 4 is a flow diagram of an example method for fine-tuning a pretrained LLM using supervised learning, in accordance with some embodiments of the present disclosure. Fine-tuning the pretrained LLM 408 allows the pretrained LLM 408, which has a general natural language understanding, to be applied in a domain-specific field. The fine-tuned LLM 438 predicts output 406 (e.g., a predicted next token in a turn of a domain-specific conversation) with high accuracy. In other words, the predicted output 406 is similar or the same as actual output 418 (e.g., the actual next token in the turn of a domain-specific conversation). For example, the fine-tuned LLM 438 learns vocabulary of the domain-specific field, information related to the domain-specific field (e.g., the number of digits included in a reward number), the average length of a turn in a conversation related to the domain-specific field, etc. Supervised learning is a method of training (or fine-tuning) a machine learning model given input-output pairs. While supervised learning is described, other training methods including semi-supervised learning or federated learning can be used to fine-tune the pretrained LLM 408.

An input-output pair (e.g., training input 402 and corresponding actual output 418) is an input with an associated known output (e.g., an expected output, a labeled output, a ground truth). A training input 402 can be a portion of an example obtained from a RAG database 210, and the actual output 418 is a next token of the portion of the example obtained from the RAG database 210. In some embodiments, the training manager 430 queries the RAG database 210 for a conversation and subsequently truncates and tokenizes the conversation. For example, the training input 402 can include x tokens of the mth user turn of the domain-specific conversation and contextual information such as the one or more previous turns before the mth user turn in the domain-specific conversation. For instance, if m=2, the training input 402 can include the first user turn in the domain-specific conversation, a first conversation bot turn of the domain-specific conversation, and x tokens of second user turn in the domain-specific conversation. The actual output 418 is the x+1 token of the mth user turn, representing a next token of the user turn. The actual output 418 can be a word, a punctuation mark (e.g., including endpoint indicators such as periods, exclamation marks, question marks, etc.), and a next line indicator representing the completed turn. Next line indicators are tokens after endpoint indicator tokens.

As described herein, the training input 402 is provided to the pretrained LLM 408 to fine-tune the LLM using the domain-specific RAG database 210. The fine-tuned LLM 438 can, therefore, generate a distribution of predicted candidate next tokens in the domain-specific field. As a result, the fine-tuned LLM 438 does not need to query the RAG database 210 for portions of a domain-specific conversation.

As shown, the fine-tuned (or trained) domain-specific component 428 together with the pretrained LLM 408 results in the fine-tuned LLM 438. In some embodiments, the domain-specific component 428 includes one or more layers appended to one or more layers of the pretrained LLM 408 (e.g., a domain-specific encoder layer appended to one or more encoder layers in the pretrained LLM 408, a domain-specific decoder layer appended to one or more decoder layers in the pretrained LLM 408, a domain-specific multi-headed attention layer appended to one or more multi-headed attention layers in the pretrained LLM 408, etc.). A layer may refer to a sub-structure a machine learning model (such as pretrained LLM 408) that includes a number of nodes (e.g., neurons) that perform a particular computation and are interconnected to nodes of adjacent layers. Nodes in each of the layers sum up values from adjacent nodes and apply an activation function, allowing the layers to detect nonlinear patterns. Nodes are interconnected by weights.

In some embodiments, the domain-specific component 428 includes one or more weight matrices appended to one or more weight matrices of the pretrained LLM 408 (e.g., a domain-specific weight matrix for encoder layers in the pretrained LLM 408, a domain-specific weight matrix for decoder layers in the pretrained LLM 408, etc.). In some embodiments, the weights of the domain-specific component are low-rank weights determined using Low-Rank Adaptation (LoRA).

In some embodiments, the weights and/or layers of the domain-specific component 428 are initialized with the weights and/or layers of the pretrained LLM 408. In some embodiments, the weights and/or layers of the domain-specific component 428 are randomly initialized.

In some embodiments, the domain-specific component 428 shifts the logits output by the pretrained LLM 408 making the output of the pretrained LLM 408 domain-specific. As a result of shifting the logits, the domain-specific component 428 rescores the probability distribution of the predicted candidate next tokens for the domain-specific field.

In some embodiments, the domain-specific component is not included in the fine-tuned LLM 438 and instead, the weights of the pretrained LLM 408 are updated during fine-tuning to obtain the fine-tuned LLM 438.

In example 400, the training manager 430 provides, as training input 402, a portion of one or more turns (e.g., the first x tokens of the mth user turn), to the pretrained LLM 408. The pretrained LLM 408 and the domain-specific component 428 produce predicted output 406. The comparator 410 compares the predicted output 406 to the actual expected (e.g., ground truth) output 418 to determine an amount of error or difference between the predicted output 406 and the actual output 418.

The error (represented by error signal 412) is determined by comparing the predicted output 406 (e.g., the predicted x+1 token of the mth user turn of the domain-specific conversation) to the actual output 418 (e.g., the actual x+1 token of the mth user turn of the domain-specific conversation) using the comparator 410. The error signal 412 may be calculated at each iteration (e.g., each pair of training inputs 402 and associated actual outputs 418), batch, and/or epoch. The error is computed using a loss function. Non-limiting examples of loss functions may include the square error function, the room mean square error function, and/or the cross-entropy error function.

The error signal 412 is used to adjust the domain-specific component 428 (e.g., the value of weights in a weight matrix, the shift of the logits, etc.). After a set of training iterations, the fine-tuned LLM 438 converges, e.g., changes (or learns) over time to generate an acceptably accurate (e.g., accuracy satisfies a defined tolerance or confidence level) predicted output 406 using the input-output pairs. The fine-tuned LLM 438 may be trained until the error determined at the comparator 410 is within a certain threshold (or a threshold number of batches, epochs, or iterations have been reached).

In some embodiments, domain-specific vocabulary obtained from the RAG database 210 (e.g., included in portions of the conversation) is added as a candidate next token of the pretrained LLM 408. In other words, whereas the pretrained LLM 408 generates an n-dimensional vector of logits, the fine-tuned LLM 438 can generate an n+k dimensional vector of logits, where k is the number of domain-specific vocabulary learned by the fine-tuned LLM 438.

Figure 5:
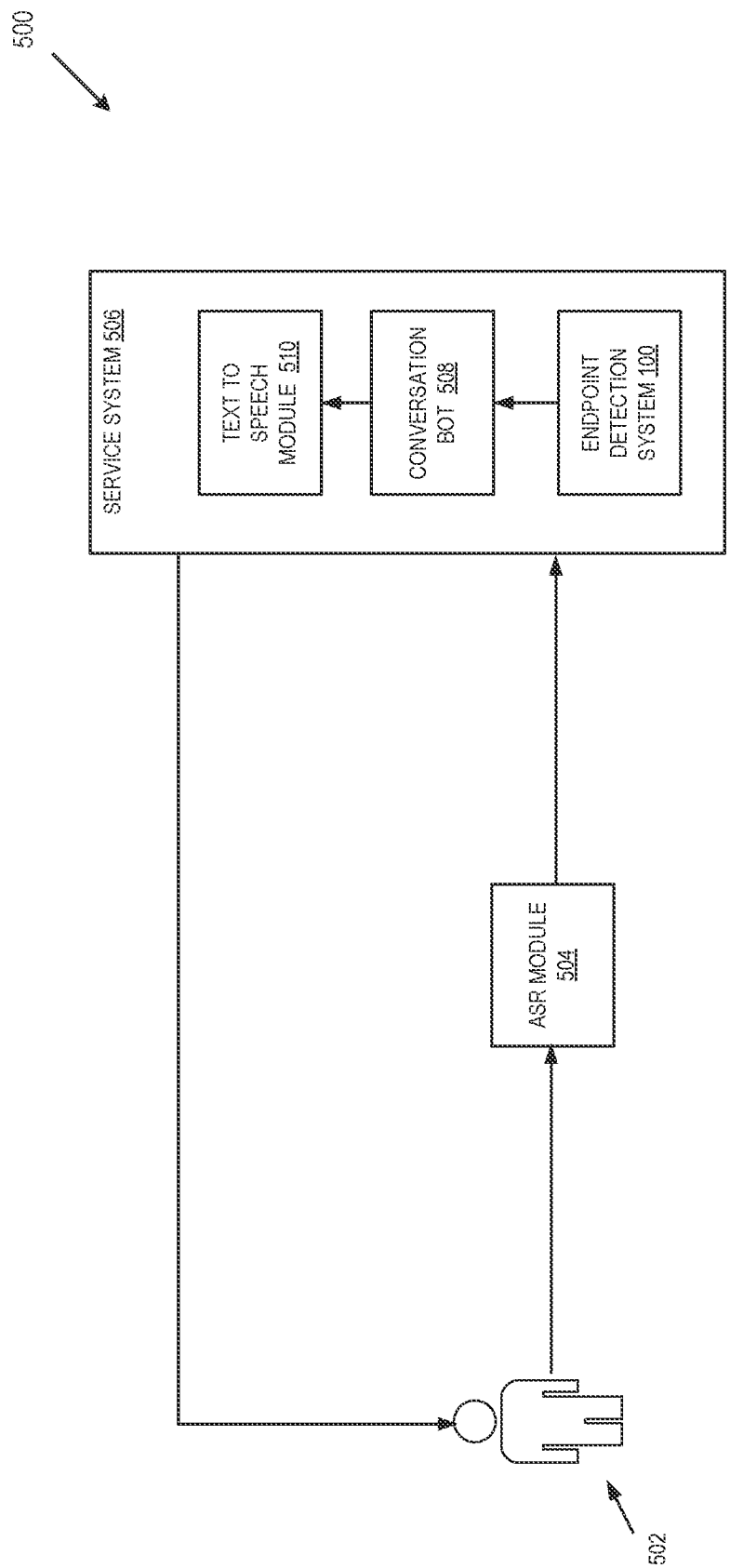
FIG. 5 illustrates an example deployment of the endpoint detection system, in accordance with one or more embodiments.

FIG. 5 illustrates an example deployment of the endpoint detection system, in accordance with one or more embodiments. The endpoint detection system 100 includes the components described above including the buffer 108 (not shown), the LLM 110 (not shown) and the classifier 112 (not shown). Example 500 illustrates a user 502 communicating with service system 506. The communication can be an audio communication (e.g., a telephone call), a visual communication (e.g., a video call), a message communication (e.g., text messages), or other type of communication. For example, a user may open up a web browser and initiate a message with a conversation bot 508 of the service system 506. For ease of description, example 500 the communication between the user 502 and the service system 506 is audio communication (e.g., a telephone call, a VoIP call, an intercom, etc.).

The service system 506 is any type of system that provides a service to the user 502 (e.g., doctor's office, technical support, hospitality, etc.). In some embodiments, the LLM 110 (not shown) of the endpoint detection system 100 is fine-tuned using domain-specific information obtained from the service system 506. In some embodiments, the LLM 110 (not shown) of the endpoint detection system 100 obtains domain-specific information using a RAG database (such as RAG database 210). Either way, the LLM 110 of the endpoint detection system 100 can have domain-specific context associated with a domain-specific service system 506.

The audio communication between the user 502 and the service system 506 includes an audio signal. The audio signal carries contextual information such as words spoken by the user 502 to the service system 506 (e.g., the conversation bot 508 of the service system 506). The contextual information of the audio signal (e.g., words) are transformed into text using ASR module 504. In some embodiments, the service system 506 hosts the ASR module 504. The ASR module 504 may use any suitable method of text recognition such as any one or more natural language processing algorithms to convert the audio signal from the user 502 into text. In some embodiments, each word spoken by the user 502 is converted to text.

In some embodiments, the ASR module 504 passes each of the words spoken by the user 502 to the service system 506 as natural language tokens. Accordingly, the endpoint detection system 100 receives a tokenized representation of a portion of the conversation (e.g., a log of the words spoken by the user 502). As described herein, the endpoint detection system 100 buffers or otherwise stores the text received from the ASR module 504. By storing the text received from the ASR module 504, the endpoint detection system 100 maintains a log of the conversation between the user 502 and the service system 506. In some embodiments, the endpoint detection system 100 also receives the audio signal of the conversation between the user 502 and the service system 506, including the words spoken by the user 502 and/or one or more extracted audio features. In some embodiments, the endpoint detection system 100 stores the audio signal and/or audio features. In some embodiments, the endpoint detection system 100 extracts audio features from the audio signal.

The endpoint detection system performs the methods and processes described herein to detect an endpoint using the text received from the ASR module 504 and the log of the conversation buffered by the endpoint detection system 100 (referred to in FIG. 1 as log 118) to determine whether the user 502 has completed their turn in the conversation. For example, as described in FIG. 1, the LLM 110 predicts candidate next tokens (e.g., a word or punctuation mark after j words received by the ASR module 504) and the classifier 112 determines whether the predicted next token represents the end of the user turn. Just because the highest probability predicted next token is a period (or other punctuation) does not mean the user's turn is complete. For example, a period can be included in pauses (e.g., ellipses), special formats (e.g., addresses, emails, numbers, currency), and honorifics (Mr., Mrs., Ms., Dr., etc.). Accordingly, the classifier 112 of the endpoint detection system 100 uses the predicated candidate next tokens (e.g., a probability distribution, a vector of logits, etc.) and in some instances, additional information (such as the audio signal, audio features, etc.) to predict whether the user 502 turn has ended.

Responsive to determining that the user 502 turn has ended, the endpoint detection system 100 triggers the conversation bot 508 to determine a response. That is, the conversation bot 508 does not interrupt the user turn because the endpoint detection system 100 has determined that the user turn has ended. In some embodiments, the endpoint detection system 100 passes a feature, the endpoint probability, a predicted next token, and/or some combination to the conversation bot 508. In these embodiments, the conversation bot 508 can make the final determination of whether the user turn has ended. Responsive to determining that the user turn has ended (or an indication that the user turn has ended), the conversation bot 508 is triggered such that a delay between the user 502 turn and the conversation bot 508 turn is minimized. Accordingly, a number of silences between the user 502 turn and the conversation bot 508 turn can be reduced or minimized such that natural turn taking and conversational flow is facilitated.

The conversation bot 508 can be an automated agent of the service system 506 (e.g., a chat bot such as a large language model). In some embodiments, the conversation bot 508 determines a response to the user 502 using the log of the conversation (e.g., buffered by the endpoint detection system 100), a collection of words determined from the ASR module 504, and/or the audio signal of the user 502 speaking (e.g., the audio signal received by the ASR module 504).

Responsive to determining that the user 502 turn has not ended, the endpoint detection system 100 does not trigger the conversation bot 508 to determine the response. The endpoint detection system 100 pauses or otherwise waits to obtain additional text from the ASR module 504 representing words spoken by the user 502. After receiving one or more text words from the ASR module 504, the endpoint detection system 100 performs the processes and methods described herein to predict whether the user 502 turn has ended.

In some embodiments, text generated from the conversation bot 508 is transformed into audio using the text to speech module 510. The text to speech module 510 can convert natural language text into an audio signal using any suitable method. For example, the speech to text module 510 generates a synthetic voice communicating the text determined by the conversation bot 508 to the user 502. The response to the user turn (e.g., the conversation bot 508 turn) is communicated to the user 502.

Figure 6:
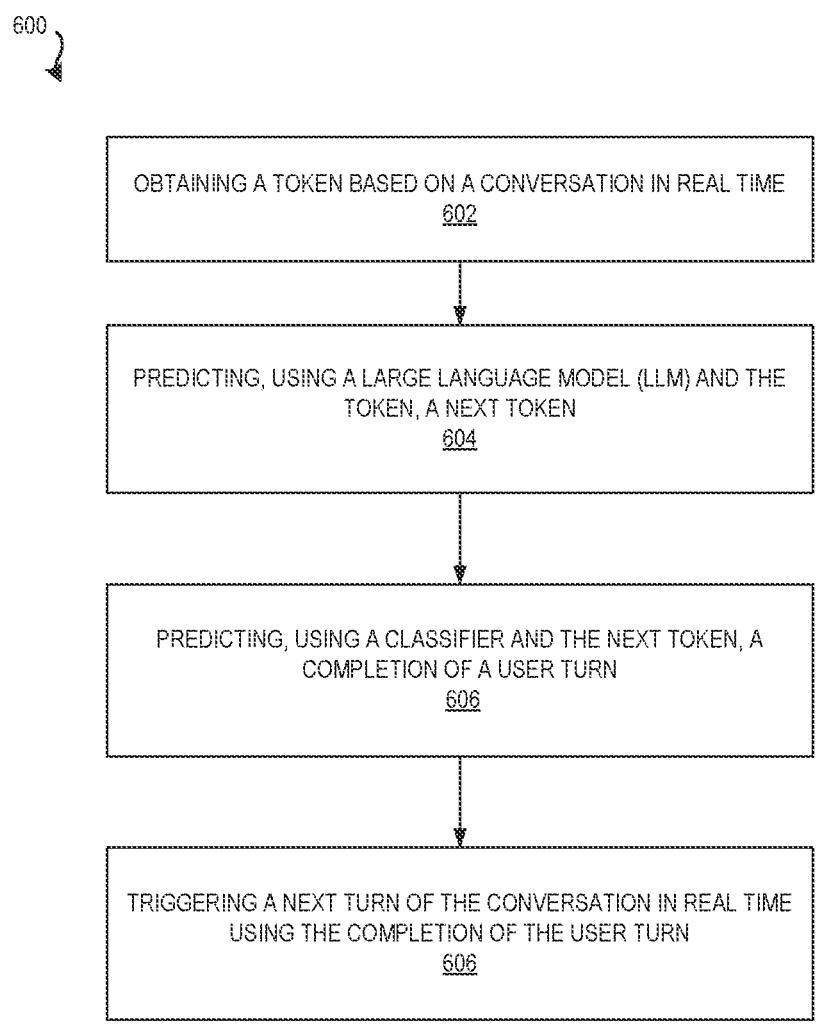
FIG. 6 illustrates a flowchart of a series of acts in a method of predicting a completed user turn, in accordance with one or more embodiments.

FIGS. 1-5 provide a number of embodiments and components configured to perform such embodiments that allow for predicting a completed user turn. FIG. 6 illustrates a flowchart of an example method of predicting a completed user turn, in accordance with one or more embodiments. It should be appreciated that FIG. 6 may be performed with additional or fewer steps than those indicated in FIG. 6. Moreover, the order of the steps indicated in FIG. 6 may be rearranged without changing the scope of FIG. 6.

FIG. 6 illustrates a flowchart 600 of a series of acts in a method of predicting a completed user turn, in accordance with one or more embodiments. In one or more embodiments, the method 600 is performed in a digital medium environment that includes endpoint detection system 100.

As illustrated in FIG. 6, the method 600 includes an act 602 of obtaining a token based on a conversation in real time. For example, audio data of an active conversation is transcribed into text into real time (e.g., during the time when the user is actively engaged in the conversation). In some embodiments, each word of the conversation is considered a token. In other embodiments, one or more words of the conversation are aggregated and considered a token. In some embodiments, a log of the conversation is maintained by buffering or otherwise storing each of the words and/or tokens of the conversation.

As illustrated in FIG. 6, the method 600 includes an act 604 of predicting, using a large language model (LLM) and the token, a next token. In operation, the LLM receives one or more tokens in a prompt, which is a natural language instruction. The prompt instructs the LLM to perform a task. For example, the prompt can instruct the LLM 110 to predict a next token of the user's turn given a sequence of tokens. For example, given j number of tokens received in the prompt, the LLM 110 predicts the j+1 token.

In some embodiments, the output of the LLM can include an n-dimensional vector of logits (e.g., n unnormalized scores corresponding to n candidate predicted next tokens for the j+1 token). Each dimension of the n-dimensional vector represents a token (including punctuation such as endpoint indicators) of n candidate predicted next tokens for the j+1 token. In other embodiments, the output of the LLM can include a probability distribution. One or more layers of the LLM include a softmax function, which is a normalized exponential function that transforms an input of real number logits into a normalized probability distribution over candidate predicted next tokens. The probability distribution represents the probability of each of the n candidate predicted next tokens being the next token (e.g., the j+1 token).

In some embodiments, the LLM generates one or more features. Features include a classification (e.g., endpoint detected, no endpoint detected), the vector of logits, the probability distribution, the top-k number of highest probability predicted candidate next tokens (e.g., determined from the probability distribution or the vector of logits), the top-p number of highest probability predicted candidate next tokens (e.g., the most probable tokens determined from the probability distribution whose probability sums to a value p), and the like.

As illustrated in FIG. 6, the method 600 includes an act 606 of predicting, using a classifier and the next token, a completion of a user turn. Just because the highest probability predicted next token is a period (or other punctuation) does not represent that the user's turn is complete. For example, a period can be included in pauses (e.g., ellipses), special formats (e.g., addresses, emails, numbers, currency), and honorifics (Mr., Mrs., Ms., Dr., etc.). Accordingly, the classifier uses the predicated candidate next tokens (e.g., a probability distribution, a vector of logits, etc.) and in some instances, additional information (such as the audio signal, audio features, etc.) to predict whether the user turn has ended.

In some embodiments, the classifier uses a threshold to compare the highest probability predicted candidate next token (e.g., based on the probability distribution of the LLM and/or other feature determined using the LLM) to a threshold. For example, if the highest probability predicted candidate next token is an endpoint indicator, and the probability of the endpoint indicator satisfies the threshold, the classifier classifies the turn as being completed. In other words, the classifier has detected an endpoint.

As illustrated in FIG. 6, the method 600 includes an act 608 of triggering a next turn of the conversation in real time using the completion of the user turn. Responsive to the classifier predicting that the turn is completed, the endpoint detection system triggers one or more downstream processes to initiate a response to the completed turn.

Figure 7:
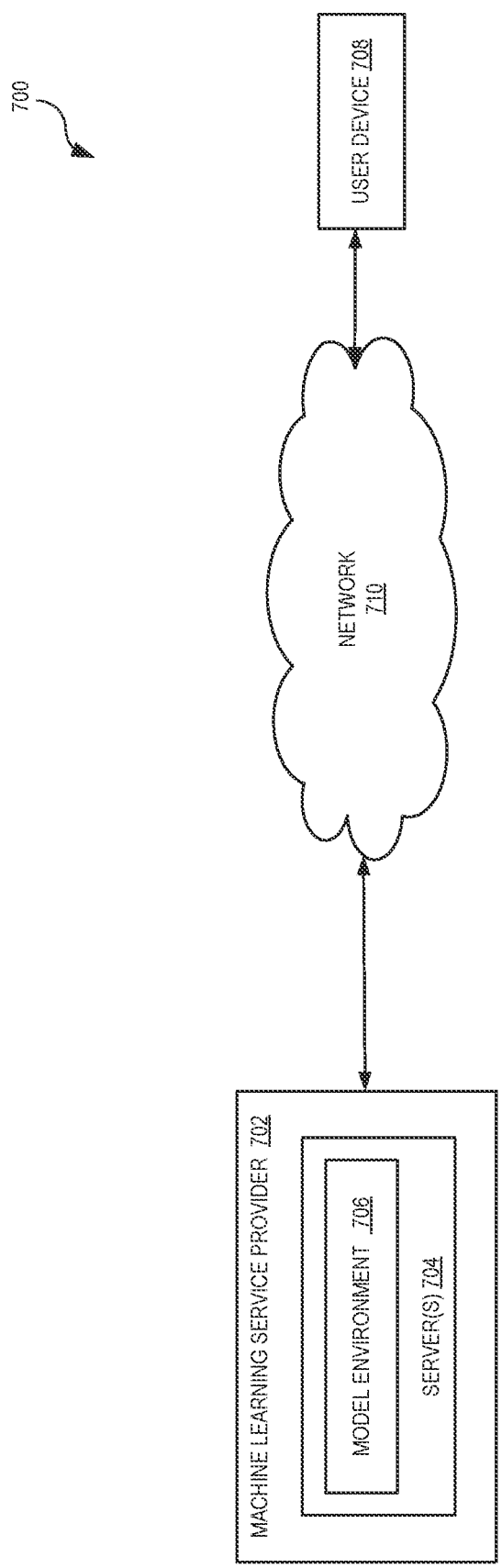
FIG. 7 illustrates a schematic diagram of an environment in which the endpoint detection system can operate in accordance with one or more embodiments.

FIG. 7 illustrates a schematic diagram of an environment in which the endpoint detection system can operate in accordance with one or more embodiments. As shown, the environment 700 includes a machine learning service provider 702 communicating with a user device 708 via a network 710. It should be appreciated that while the user device 708 is shown communicating with the machine learning service provider 702 via network 710, the user device 708 may also communicate directly with the machine learning service provider 702. The communication between the user device 708 and the machine learning service provider 702 via network 710 may be any communication such as wireless communication and/or wired communication. In an example implementation, the machine learning service provider 702 may host the machine learning system on a server 704 using the model environment 706 and receive data from one or more user device(s) 708 via network 710.

The machine learning service provider 702 may be a service provider configured to perform one or more tasks. The machine learning service provider 702 includes one or more server(s) 704 each including a model environment 706. Each of the servers may be specialized to perform a given task of the machine learning service provider 702. Accordingly, each server 704 has a unique model environment 706 that facilitates the operation of the server. The model environment 706 may include any data necessary to perform the operations of the specific server 704 (e.g., trained machine learning models, training data, machine learning libraries, machine learning functions, etc.). In other configurations, a single server may be configured to perform multiple tasks of the machine learning service provider 702. That is, the server 704 may include multiple model environments 706.

The user device 708 may be any computing devices configured to communicate data to the machine learning service provider 702. In some implementations, the user device 708 may capture or otherwise collect such data (e.g., using a camera, a microphone, some combination, or other sensor).

To illustrate, data from one or more user device(s) 708 (e.g., an interaction with an application executing the endpoint detection system 100) may be fed to server 704 via network 710. Upon receiving the data, such as an initiation of a communication (e.g., a telephone call), the server 704 can execute the model environment 706 to execute the endpoint detection system 100. The endpoint detection system 100 performs the methods and processes described to determine whether the communication received from the user device 708 identifies the end of the user turn in a conversation.

In some embodiments, the data obtained by the server 704 includes a transcript of the communication with the user device 708. In some embodiments, the server 704 queries one or more external RAG databases to obtain domain-specific portions of conversations.

In some embodiments, the functions of the machine learning service provider 702 may be implemented via a user device 708. Additionally or alternatively, the functions of the user device 708 may be implemented via the machine learning service provider 702. The functions of the user device 708 and/or machine learning service provider 702 may be implemented in hardware, software, or both. For example, the user device 708 and/or machine learning service provider 702 may include instructions stored on a computer-readable storage medium and executable by processors of the user device 708 and/or machine learning service provider 702. Computer executable instructions may include instructions that cause one or more processors to perform one or more functions. The computer executable instructions may be stored in any computer-readable media accessible by one or more processors of the machine learning service provider 702 and/or the user device 708. In some embodiments, one or more portions of functions of the user device 708 and/or machine learning service provider 702 may be implemented in hardware, software, or both.

While one user device 708 is shown, it should be appreciated that multiple user devices 708 may communicate with the machine learning service provider 702 via network 710. Additionally or alternatively, multiple user device 708 may communicate with each other (e.g., without communicating with machine learning service provider 702). Moreover, while one machine learning service provider 702 is shown, it should be appreciated that multiple machine learning service providers 702 may communicate with one or more user devices 708. Similarly, multiple machine learning service providers 702 may communicate with each other (e.g., without communicating with the user device 708).

Figure 8:
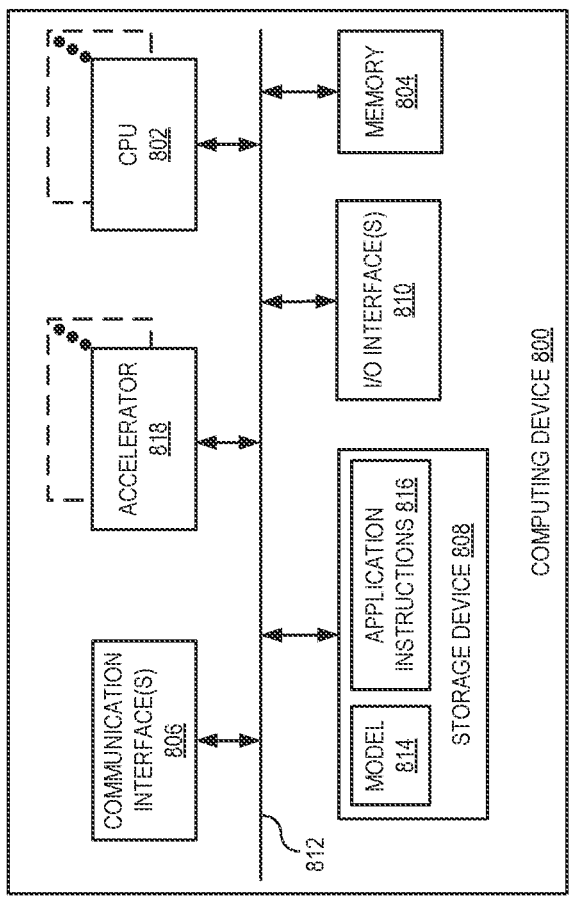
FIG. 8 illustrates a block diagram of an example computing device in accordance with one or more embodiments.

FIG. 8 illustrates a block diagram example computing device that may be configured to perform one or more of the processes described above. One or more computing devices such as the computing device 800 may implement one or more portions of the endpoint detection system 100. As shown in FIG. 8, the computing device can comprise one or more central processing units (CPUs) 802, memory 804, one or more communication interfaces 806, a storage device 808, one or more I/O interfaces 810 and one or more accelerators 818. It should be appreciated that the computing device 800 can include different components than those shown in FIG. 8.

In particular embodiments, CPU(s) 802 include hardware and/or software for executing instructions. Similarly, accelerator(s) 818 include hardware and/or software for executing instructions. In some embodiments, accelerator(s) 818 include one or more graphics processing units (GPUs). In general, the accelerator(s) 818 and CPU(s) 802 fetch data from the storage device 808 and/or memory 804. For example, the accelerator(s) 818 and CPU(s) 802 may fetch instructions from the storage device 808 and/or memory 804 and execute one or more functions identified by the instructions. The CPU(s) 802 and/or accelerator(s) 818 execute the instructions to perform the one or more processes as described herein. For example, CPU 802 may receive instructions from memory 804 (e.g., non-transitory computer readable medium) and execute those instructions, resulting in one or more processes described herein.

The storage device 808 and/or memory 804 may include non-transitory computer readable memory such as non-volatile and/or non-volatile memory (e.g., RAM, ROM, EEPROM, CD ROM, SSDs, flash memory). The storage device 808 and/or memory 804 may be configured to store different types of data fetched by the CPU 802 and/or accelerator 818. For example, the memory 804 may include instructions directed to the functional operation of the computing device 800. Moreover, the storage device 808 may include application instructions 816 and/or models 814 directed to the applicational use of the computing device 800. For example, the model 814 may include the endpoint detection system 100 as described herein. The application instructions 816 may contain instructions necessary to perform the functions of the endpoint detection system 100.

The computing device 800 can further include one or more communication interfaces 806. A communication interface 806 can include hardware, software, or both configured to facilitate external communication with one or more external computing devices. The external communication with one or more external computing devices may be wireless communication and/or wired communication. The communication interface 806 may be configured to facilitate such wired/wireless communication.

The bus 812 can facilitate internal communication of the computing device 800 and may comprise hardware, software, or both, coupling components of computing device 800 to each other.

The computing device 800 also includes one or more input or output ("I/O") interfaces 810. The I/O interface 810 is configured to receive inputs/outputs. In an example implementation, the I/O interface 810 may receive user inputs (e.g., audio data, text data, etc.). Additionally or alternatively, the I/O interface 810 may receive sensor inputs (e.g., camera images, video frames, etc.). The I/O interface 810 may be configured to output data (e.g., an indication that the user turn has ended) to one or more other computing devices.

Various embodiments have been described and illustrated. The descriptions and illustrations herein are not to be construed as limiting. Alternate embodiments may exist without departing from the scope of the embodiments described and illustrated herein.

Disjunctive language such as "at least one of A, B, or C" is not intended to imply that a given embodiment requires at least one of A, at least one of B, or at least one or C. Instead, it is intended to be understood to mean either A, B, or C, or any combination thereof.

What is claimed is:

1. A method comprising:
    generating a log of an ongoing audio conversation in real time that involves at least a first user, wherein the log comprises a plurality of tokens that represent text data generated in real time via transcription of the ongoing audio conversation, wherein participants in the ongoing audio conversation have taken turns communicating during the ongoing audio conversation;
    receiving, using a large language model (LLM), a context of the ongoing audio conversation comprising at least one token from the plurality of tokens;
    predicting, using the LLM and the context, a next token;
    predicting, using a classifier and the next token, a completion of a current turn of the first user speaking; and
    triggering a next turn of the ongoing audio conversation in real time using the completion of the current turn.

2. The method of claim 1, wherein the next turn of the conversation in real time is triggered to minimize a number of pauses in the conversation in real time.

3. The method of claim 1, further comprising:
    retrieving an example completed user turn of a stored conversation, wherein predicting the next token is further based on the example completed user turn.

4. The method of claim 1, wherein the log comprises one or more tokens based on the conversation in real time.

5. The method of claim 1, wherein predicting, using the classifier and the next token, the completion of the current turn further comprises:
    generating a feature vector using the next token; and
    predicting, using the classifier and the feature vector, an endpoint probability, wherein the endpoint probability represents a likelihood of the completion of the current turn.

6. The method of claim 1, wherein the at least one token is based on a speech-to-text transformation of an audio signal of the conversation, and wherein the predicted completion of the user current turn is further based on one or more audio features of the audio signal.

7. The method of claim 1, further comprising:
    obtaining a second token based on the conversation in real time;
    predicting, using the LLM and the second token, an endpoint indicator token; and
    predicting, using the classifier and the endpoint indicator token, a non-completion of the current turn.

8. A non-transitory computer-readable medium storing executable instructions, which when executed by a processing device, cause the processing device to perform operations comprising:
    generating a log of an ongoing audio conversation in real time that involves at least a first user, wherein the log comprises a plurality of tokens that represent text data generated in real time via transcription of the ongoing audio conversation, wherein participants in the ongoing audio conversation have taken turns communicating during the ongoing audio conversation;
    receiving, using a large language model (LLM), a context of the ongoing audio conversation comprising at least one token from the plurality of tokens;
    predicting, using the LLM and the context, a next token;
    predicting, using a classifier and the next token, a completion of a user current turn of the first user speaking; and triggering a next turn of the ongoing audio conversation in real time using the completion of the current turn.

9. The non-transitory computer-readable medium of claim 8, wherein the next turn of the conversation in real time is triggered to minimize a number of pauses in the conversation in real time.

10. The non-transitory computer-readable medium of claim 8, wherein the operations further comprise:
retrieving an example completed user turn of a stored conversation, wherein predicting the next token is further based on the example completed user turn.

11. The non-transitory computer-readable medium of claim 8, wherein the log comprises one or more tokens based on the conversation in real time.

12. The non-transitory computer-readable medium of claim 8, predicting, using the classifier and the next token, the completion of the current turn further comprises operations including:
generating a feature vector using the next token; and
predicting, using the classifier and the feature vector, an endpoint probability, wherein the endpoint probability represents a likelihood of the completion of the current turn.

13. The non-transitory computer-readable medium of claim 8, wherein the at least one token is based on a speech-to-text transformation of an audio signal of the conversation, and wherein the predicted completion of the current turn is further based on one or more audio features of the audio signal.

14. The non-transitory computer-readable medium of claim 8, wherein the operations further comprise:
obtaining a second token based on the conversation in real time;
predicting, using the LLM and the second token, an endpoint indicator token; and
predicting, using the classifier and the endpoint indicator token, a non-completion of the current turn.

15. A system comprising:
a memory component; and
a processing device coupled to the memory component, the processing device to perform operations comprising:
generating a log of an ongoing audio conversation in real time that involves at least a first user, wherein the log comprises a plurality of tokens that represent text data generated in real time via transcription of the ongoing audio conversation, wherein participants in the ongoing audio conversation have taken turns communicating during the ongoing audio conversation;
receiving, using a large language model (LLM), a context of the ongoing audio conversation comprising at least one token from the plurality of tokens;
predicting, using the LLM and the context, a next token;
predicting, using a classifier and the next token, a completion of a current turn of the first user speaking; and
triggering a next turn of the ongoing audio conversation in real time using the completion of the current turn.

16. The system of claim 15, wherein the next turn of the conversation in real time is triggered to minimize a number of pauses in the conversation in real time.

17. The system of claim 15, wherein the operations further comprise:
retrieving an example completed user turn of a stored conversation, wherein predicting the next token is further based on the example completed user turn.

18. The system of claim 15, wherein the log comprises one or more tokens based on the conversation in real time.

19. The system of claim 15, predicting, using the classifier and the next token, the completion of the current turn further comprises operations including:
generating a feature vector using the next token; and
predicting, using the classifier and the feature vector, an endpoint probability, wherein the endpoint probability represents a likelihood of the completion of the current turn.

20. The system of claim 15, wherein the at least one token is based on a speech-to-text transformation of an audio signal of the conversation, and wherein the predicted completion of the current turn is further based on one or more audio features of the audio signal.

* * * * *